UNITED STATES PATENT OFFICE.

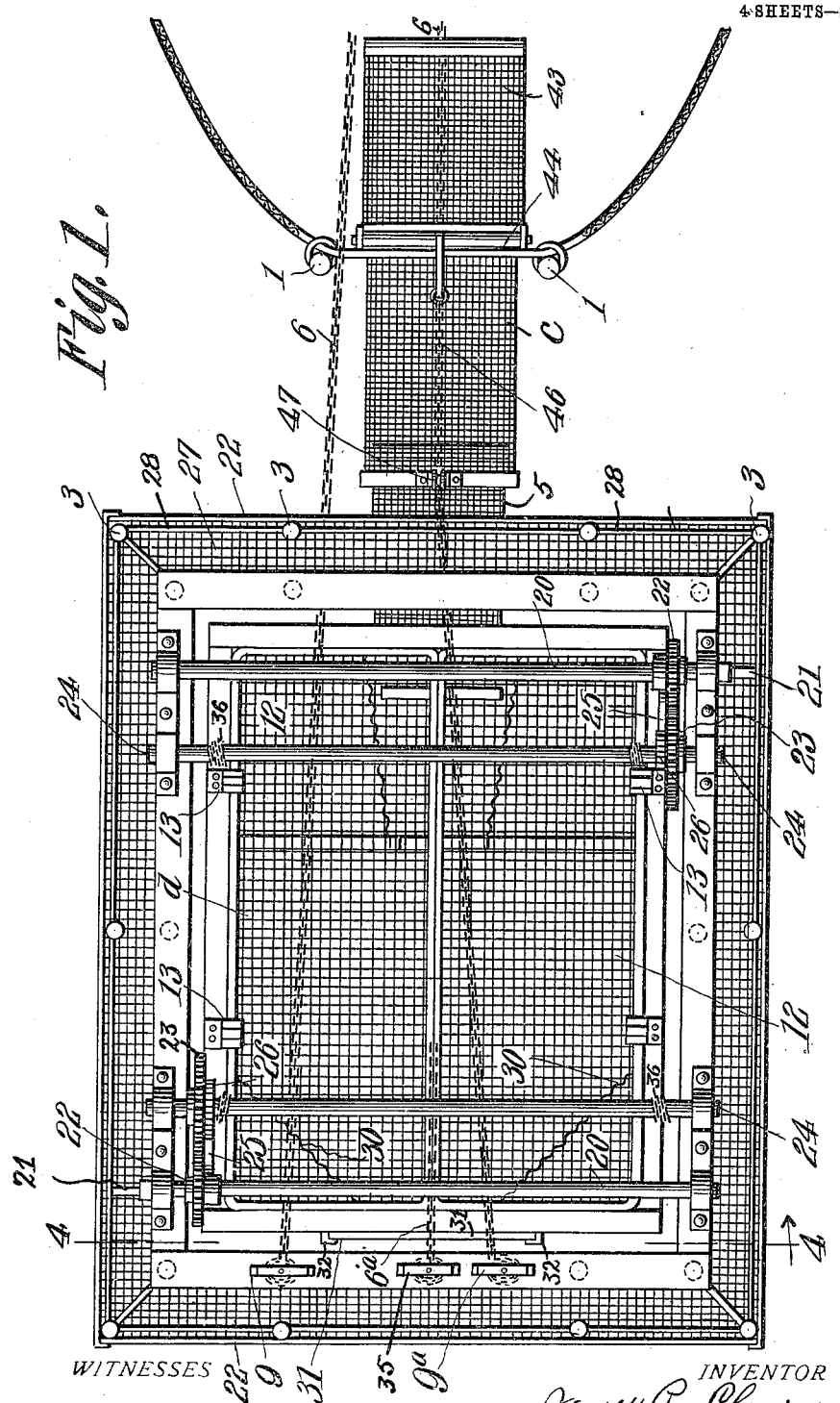

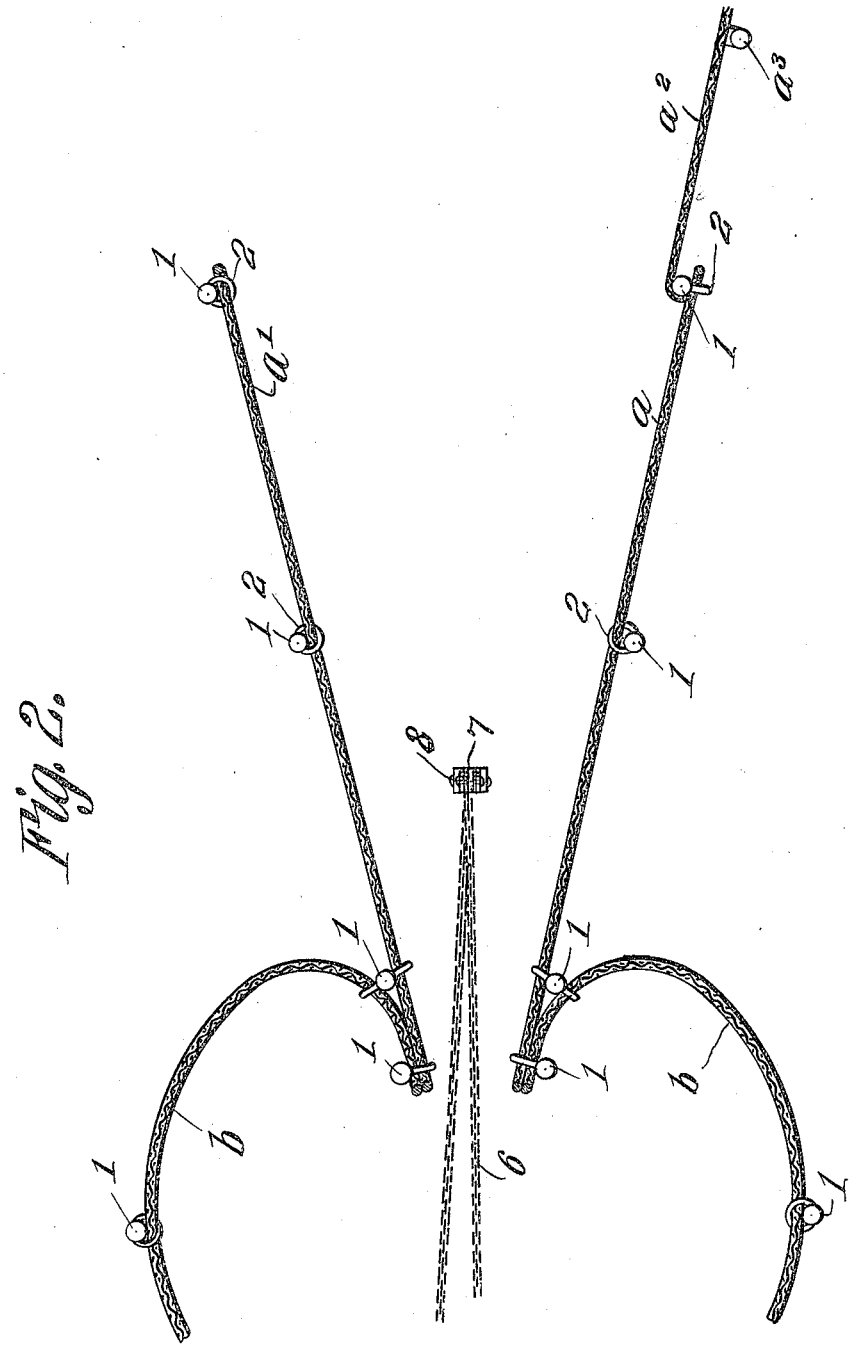

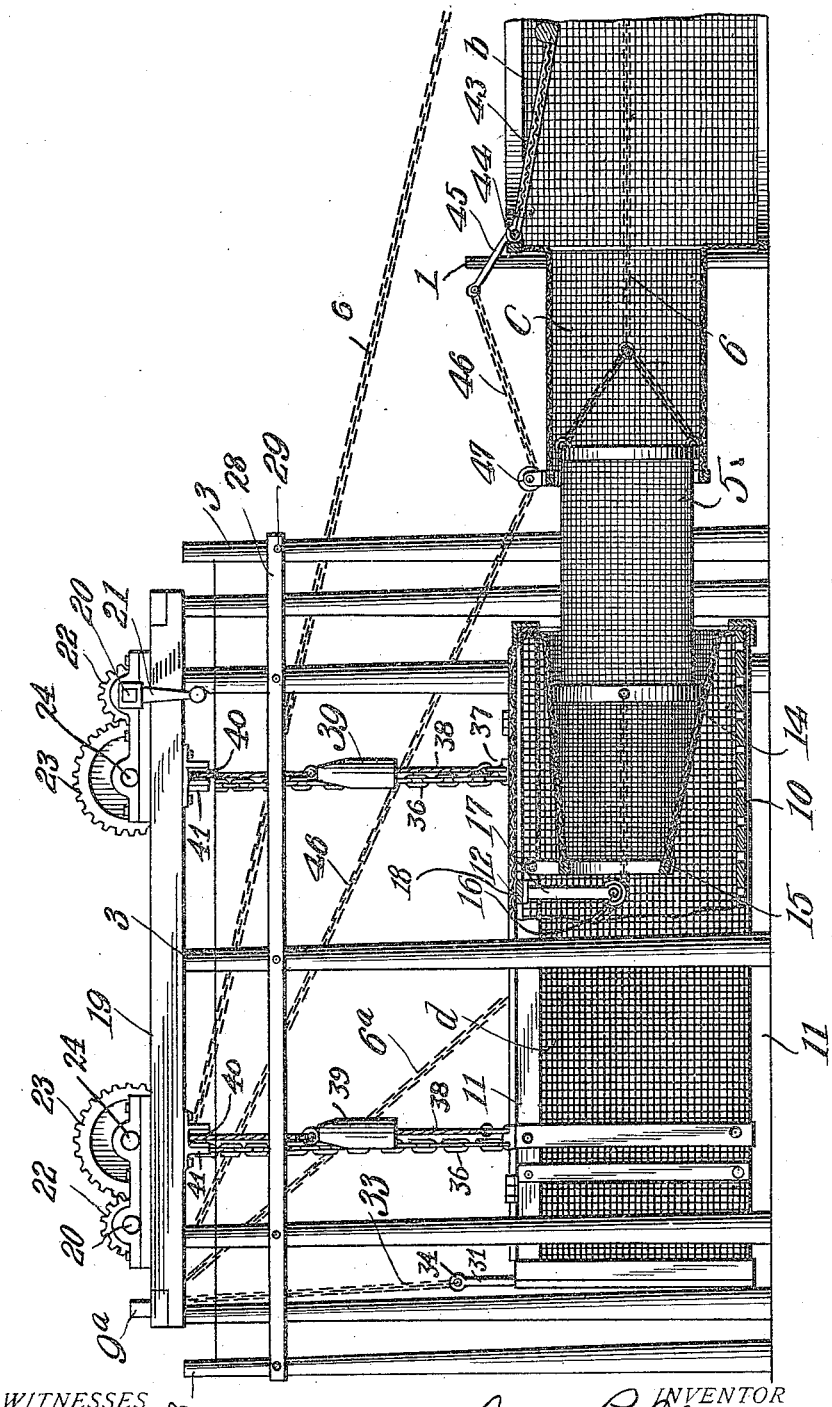

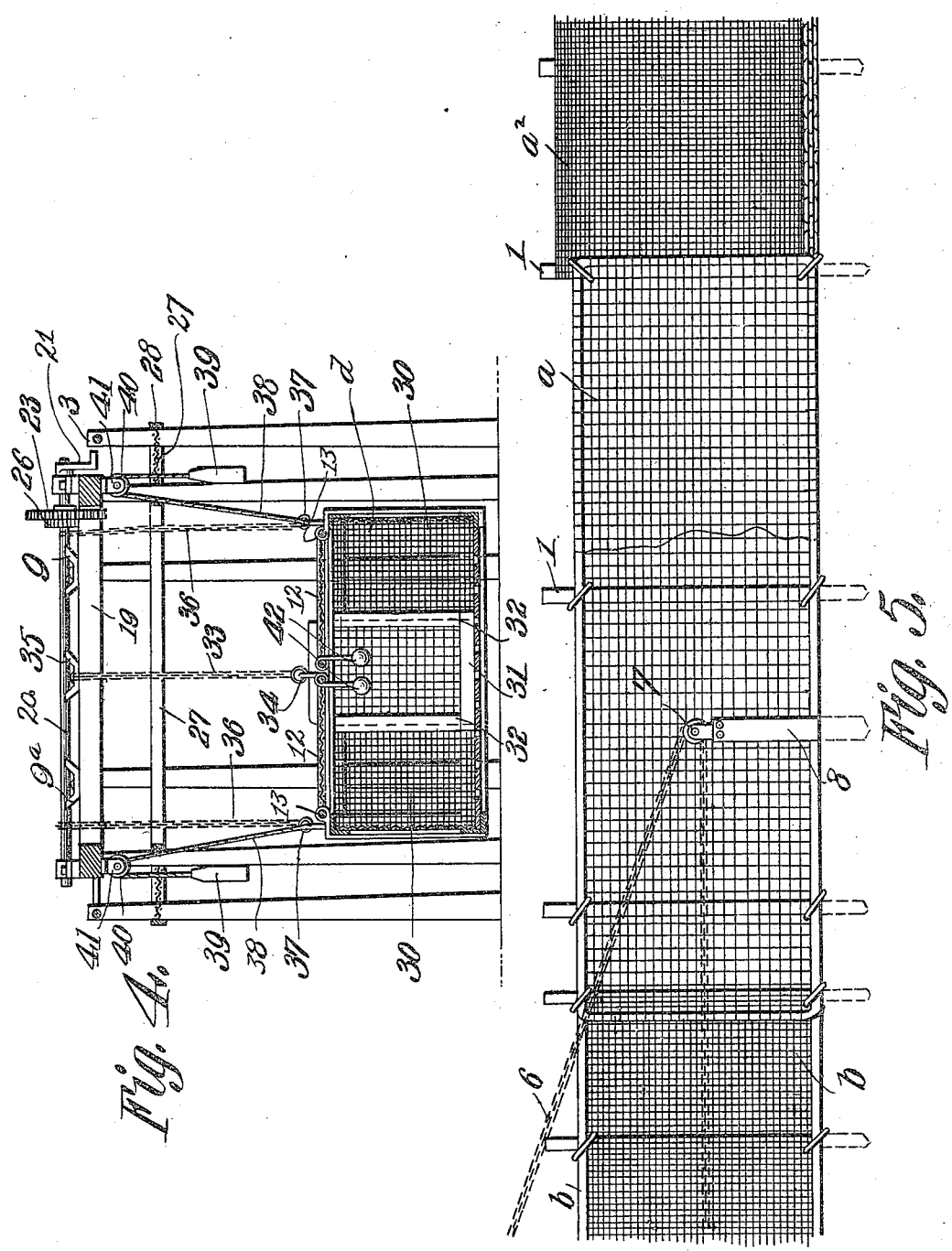

JAMES P. CLEARY, OF BALTIMORE, MARYLAND.

FISH-TRAP.

945,840.　　　　Specification of Letters Patent.　　Patented Jan. 11, 1910.

Application filed March 13, 1909. Serial No. 433,104.

*To all whom it may concern:*

Be it known that I, JAMES P. CLEARY, a citizen of the United States, residing at Baltimore city, State of Maryland, have invented certain new and useful Improvements in Fish-Traps, of which the following is a specification.

This invention relates to fish traps, and one of the principal objects of the invention is to provide reliable and efficient means for raising the crib or pot containing the fish for discharging them into a boat.

Another object of the invention is to provide a fish trap in which the fish are led into the heart and from the heart into the crib or pot, means being provided for raising the crib or pot for discharging the fish into a boat on the surface of the water.

Another object of the invention is to provide means for withdrawing the fishway from the pot whenever it is desired to elevate the latter for discharging the fish.

Still another object of the invention is to provide means for closing the heart and withdrawing the fishway from the pot and at the same time providing means whereby all of these operations may be performed while standing upon a platform surrounding the pot above the surface of the water.

Still another object of the invention is to provide a pair of windlasses for raising the pot for discharging the fish, the windlasses being located upon a frame supported above the pot and a platform being supported around the pot for permitting the operators to elevate the pot and operate the other pots of the trap.

With the foregoing object in view my invention consists in certain novel features of construction and combination of parts which will be hereinafter described and pointed out in the claims.

In the accompanying drawings, Figure 1 is a top plan view of the pot, the fishway and a portion of the heart. Fig. 2 is a top plan view of the remaining portion of the heart and the leads, said figure forming a continuation of the fish trap from that shown in Fig. 1. Fig. 3 is a side elevation and partial section of that portion of the trap shown in Fig. 1. Fig. 4 is a transverse vertical sectional view taken on the line 4—4 of Fig. 1, looking in the direction indicated by the arrow. Fig. 5 is a side elevation of a portion of the heart and one of the leads as shown in plan view in Fig. 2.

Referring to the drawing, $a$ and $a'$ are the leads; $b$ the heart; $c$ the fishway, and $d$ the pot or crib. The leads are secured in position by means of stakes 1 driven into the bed of the stream and connected by rings 2.

$a$ is the outer lead, and $a'$ is the shore line lead. The lead $a$ is provided with an auxiliary extension $a^2$ which is removable and transferable to the lead $a'$ whenever the trap is located to make the lead $a'$ the outer lead. The auxiliary extension $a^2$ is secured in place by means of a stake $a^3$ near the outer end, while the inner end is secured to one of the stakes 1 near the outer end of the lead $a$. The heart $b$ is secured in place by means of the stakes 1, and the pot or crib is disposed within a series of surrounding stakes or posts 3 which extend above the surface of the water. The leads, the heart, the fishway and the pot are all formed of any suitable material, preferably of galvanized wire netting properly bound at the raw edges with sheet metal. The fishway is connected to the heart $b$, and the telescopic section 5 has connected to its front end a chain 6 which extends to a point between the leads $a$, $a'$ and passes around a grooved roller 7 journaled upon a stake 8, said chain extending from thence to a belaying cleat 9 on the top of the pot frame.

The pot $d$ is provided with a perforated metal floor 10, and the upper and lower edges of the pot are bound by angle iron stays 11. The top of the pot is covered by doors 12 hinged at 13. Extending into the pot is the tapering inlet 14 having a contracted inner end 15, and the telescopic section 5 normally communicates with the inlet 14. A chain $6^a$ is connected to the inner end of the telescopic section 5, said chain extending up to a belaying cleat 35 on the pot frame, said chain passing under a roller 16 mounted upon a depending bracket 17 supported upon a cross bar 18 near the top of the pot. Supported on the top of the stakes 3 is a frame 19, and supported upon said frame in suitable bearings are the hoisting mechanisms each comprising a shaft 20 having a crank 21 upon its end. A gear wheel 22 is secured near one end of each of the shafts 20, said gear wheel meshing with a larger gear 23 carried by a shaft 24, one near each end of the frame 19. A pawl 25 on each of the shafts 20 is adapted to engage a ratchet wheel 26 on the shafts 24. A wire cloth platform 27 is secured to the stakes 3 by means of the metal bindings 28 and the rods 29 extending through the posts and connected to the metal bindings. At the outer end inside the pot are the converging screens 30, and upon the outer end of the pot is a sliding door 31 mounted in keepers 32. A chain 33 is connected by means of a ring 34 to the upper end of the door 31, said chain extending up to a cleat 35 on the top of the frame 19.

The pot $d$ is elevated by means of chains 36 connected to the pot at 37, the upper ends of said chains passing around the shafts 24, and to compensate for the weight of the pot cables 38 are connected at one of their ends to the pot, while upon the opposite end of each of said cables is a weight 39. These cables pass over pulleys 40 journaled in brackets 41 depending from the frame 19. The doors 12 are provided with weights 42 designed to hold the doors closed.

A gravity door 43 is hinged to a rod 44 extending across the inner end of the heart $b$, and connected to said door is a lever 45 to which a chain 46 is connected, said chain passing under a pulley 47 and from thence to the cleat $9^a$.

The operation of my invention may be briefly described as follows: When it is desired to transfer the fish from the pot $d$ to a boat moored at the door 31, by pulling upon the chain 6 the telescopic section 5 is withdrawn from the inlet 14 and by thus slackening said chain 6 and disconnecting chain 46 from its cleat, the door 43 will close by gravity, and the fish in the heart $b$ will be prevented from escaping. The pot is then elevated by means of the cranks 21 until it is partially above the water line. The boat to receive the "catch" is provided with a suitable spout to rest upon the sill of the door 31, said spout having side flanges to prevent the escape of the fish. When the door 31 is opened fish may be discharged by raising the pot slightly out of the water and by elevating the inner end thereof. After the "catch" has been discharged into the boat the door 31 is again closed; the pot is lowered by the operator standing upon the platform 27; the telescopic section 5 is returned to its normal position by means of the chain $6^a$, and the gravity door 43 is opened by pulling upon the chain 46.

From the foregoing it will be obvious that my fish trap will facilitate the operation of taking the "catch" from the pot and discharging it into a boat; that the work of taking the fish can be quickly done, and that the trap as a whole is comparatively simple and can be installed without great cost.

Slight changes and alterations might be resorted to in the form and arrangement of the several parts described without departing from the spirit and scope of my invention and hence I do not wish to limit myself to the exact construction as herein set forth, but, Having fully described my invention, what I claim as new and desire to secure by Letters Patent, is;

1. A fish trap comprising leads, a heart, a fishway and a crib, a telescopic section in the fishway adapted to communicate with the inlet in the crib, means for operating said telescopic section, and means for elevating the crib.

2. A fish trap comprising leads, a heart, a connected fishway, a crib, an inlet communicating with said crib, a telescopic section connected to the fishway and communicating with the inlet, means for operating said telescopic section, and hoisting mechanism for elevating the crib.

3. In a fish trap, leads, a heart, a fishway, a gravity door for closing communication between the heart and fishway, a telescopic section in the fishway, means for operating said section, a crib, an inlet therefor having a contracted inner end, a series of stakes surrounding the crib, a frame mounted on the stakes, and hoisting mechanism mounted on the frame for elevating the crib.

4. In a fish trap and in combination with leads, a heart and a fishway having a telescopic section, of a crib with which said telescopic section communicates provided with a perforated bottom, weighted covers, a sliding door, and means for raising said crib.

5. In a fish trap, and in combination with the leads, a heart and a fishway having a telescopic section, of a crib with which said telescopic section communicates, stakes surrounding said crib, a frame mounted on said stakes, hoisting mechanism mounted on said frame, connections between said hoisting mechanism and crib, and counterweights connected to cables passing over pulleys, said cables being connected to said crib.

In testimony whereof I affix my signature in presence of two witnesses.

JAMES P. CLEARY.

Witnesses:
 E. WALTON BREWINGTON,
 MARY M. MAGRAW.